(12) United States Patent
Koreeda et al.

(10) Patent No.: US 7,295,746 B2
(45) Date of Patent: Nov. 13, 2007

(54) OPTICAL CONNECTOR WHICH CAN BE DISASSEMBLED AND DISASSEMBLING TOOL SUITABLE TO DISASSEMBLE THE SAME

(75) Inventors: Yuichi Koreeda, Tokyo (JP); Makoto Sanguu, Tokyo (JP); Kiyoyuki Mutaguchi, Tokyo (JP); Yoshiteru Abe, Kanagawa (JP); Masaru Kobayashi, Kanagawa (JP); Ryou Nagase, Tokyo (JP)

(73) Assignees: Japan Aviation Electronics Industry, Limited, Tokyo (JP); Nippon Telegraph and Telephone Corporation, Tokyo (JP)

( * ) Notice: Subject to any disclaimer, the term of this patent is extended or adjusted under 35 U.S.C. 154(b) by 57 days.

(21) Appl. No.: 11/097,556

(22) Filed: Apr. 1, 2005

(65) Prior Publication Data
US 2005/0226567 A1    Oct. 13, 2005

(30) Foreign Application Priority Data
Apr. 2, 2004    (JP)    ............... 2004-110130

(51) Int. Cl.
*G02B 6/00*    (2006.01)
(52) U.S. Cl. ...................... 385/134; 385/136
(58) Field of Classification Search ............ 385/53–99, 385/134–140; 294/100
See application file for complete search history.

(56) References Cited

U.S. PATENT DOCUMENTS

| | | | |
|---|---|---|---|
| 5,040,867 A * | 8/1991 | de Jong et al. ............... | 385/60 |
| 6,439,780 B1 * | 8/2002 | Mudd et al. .................. | 385/83 |
| 6,652,156 B2 | 11/2003 | Shinagawa et al. | |
| 6,819,855 B2 * | 11/2004 | Fujiwara et al. ............ | 385/134 |
| 7,020,376 B1 * | 3/2006 | Dang et al. ................. | 385/135 |
| 7,035,519 B2 * | 4/2006 | Segroves et al. ........... | 385/134 |
| 7,149,401 B2 * | 12/2006 | Koreeda et al. ............ | 385/137 |
| 2004/0013388 A1 * | 1/2004 | Fujiwara et al. ............ | 385/134 |

FOREIGN PATENT DOCUMENTS

| | | |
|---|---|---|
| JP | 63-178804 U | 11/1988 |
| JP | 3354503 | 3/2000 |
| JP | 2000-98183 A | 4/2000 |

OTHER PUBLICATIONS

Chinese Office Action dated Mar. 2, 2007 with English translation.

* cited by examiner

*Primary Examiner*—Brian Healy
*Assistant Examiner*—Charlie Peng
(74) *Attorney, Agent, or Firm*—Collard & Roe, P.C.

(57) ABSTRACT

In an optical connector for use in connecting an optical fiber, a shell member has an engaging portion. An internal member holds the optical fiber and is received in the shell member to be removable in a first direction. A stopper is engaged with the engaging portion in the first direction. A spring is engaged with the internal member and the stopper and urges the internal member towards a second direction opposite to the first direction. The shell member has a release operation portion for releasing the engaging portion from the stopper.

5 Claims, 7 Drawing Sheets

OPTICAL CONNECTOR WHICH CAN BE DISASSEMBLED AND DISASSEMBLING TOOL SUITABLE TO DISASSEMBLE THE SAME

This application claims priority to prior Japanese patent application JP 2004-110130, the disclosure of which is incorporated herein by reference.

BACKGROUND OF THE INVENTION

This invention relates to an optical connector which can be disassembled, a disassembling tool for disassembling the optical connector, and a method of using the disassembling tool.

For example, Japanese Patent Publication (JP-B) No. 3354503 discloses an optical connector which can be disassembled and a tool for use in disassembling the optical connector. The optical connector comprises a housing and a ferrule removably attached to the housing. The housing has a pair of locking members. On the other hand, the ferrule has a flange portion. When the ferrule is attached to the housing, the flange portion is located between the locking members to be locked therewith. The ferrule is connected to an optical fiber.

The tool serves to attach and remove the ferrule to and from the housing and is called a ferrule attaching tool. The ferrule attaching tool has a grip portion for an operator to grip, and a pair of elastic clamping members connected to the grip portion and adapted to clamp the ferrule.

In order to remove the ferrule from the housing, the elastic clamping members are inserted inside the locking members to force the locking members outward. As a consequence, the locking members are disengaged from the flange portion of the ferrule. Thereafter, the ferrule is clamped by the elastic clamping members and removed from the housing. In this manner, the optical connector is disassembled. In order to attach the ferrule to the housing, an operation is carried out in the manner reverse to that mentioned above.

With the above-mentioned structure, the ferrule is attached and removed to and from the housing in the state where an optical fiber is protected by the ferrule. Therefore, the optical fiber is prevented from being bent and damaged during attaching and removing operations.

Recently, proposal is made of an optical connector of the type such that an optical fiber is inserted into an aligning member and directly connected to a mating optical connector. The optical connector of the type does not use the ferrule so that the optical fiber may often be bent and damaged.

If the optical fiber is bent and damaged, the optical fiber must be replaced by a new optical fiber. However, an existing connector called a SC (Subscriber Loop system optical fiber Connector) or a MU (Miniature Unit coupling) inherently has a structure which can not be disassembled. Accordingly, the optical fiber can not be replaced.

SUMMARY OF THE INVENTION

It is therefore an object of this invention to provide an optical connector which can be disassembled so as to enable replacement of an optical fiber.

It is another object of this invention to provide a disassembling tool suitable for use in disassembling the above-mentioned optical connector.

It is still another object of this invention to provide a method of using the above-mentioned disassembling tool.

Other objects of the present invention will become clear as the description proceeds.

According to an aspect of the present invention, there is provided an optical connector for use in connecting an optical fiber, comprising a shell member having an engaging portion, an internal member holding the optical fiber and received in the shell member to be removable in a first direction, a stopper engaged with the engaging portion in the first direction, and a spring engaged with the internal member and the stopper and urging the internal member towards a second direction opposite to the first direction, the shell member having a release operation portion for releasing the engaging portion from the stopper.

According to another aspect of the present invention, there is provided a disassembling tool for disassembling an optical connector, the disassembling tool comprising a tool body and a pair of finger portions extending from the tool body in a second direction in parallel to each other, the finger portions having extending ends in the second direction and confronting surfaces faced to each other in a third direction perpendicular to the second direction, each of the finger portions having a pair of adjacent surfaces opposite to each other in a fourth direction perpendicular to the second and the third directions, at least one of the adjacent surfaces of each finger portion having a slant surface inclined to reduce the thickness of the finger portion in the fourth direction towards the extending end, each of the confronting surface having a groove extending from the extending end in a first direction opposite to the second direction, the groove being adapted to receive a part of the optical connector.

DESCRIPTION OF THE PREFERRED EMBODIMENT

Figure 1:
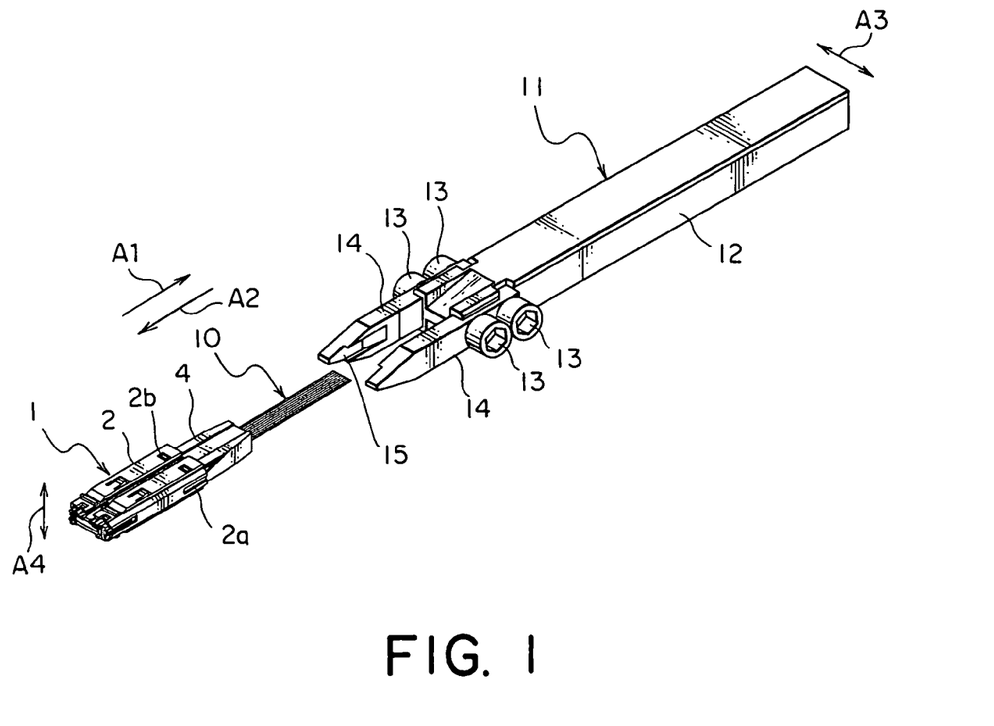
FIG. 1 is a perspective view showing an optical connector and a disassembling tool according to an embodiment of this invention together with an optical fiber.
Figure 2:
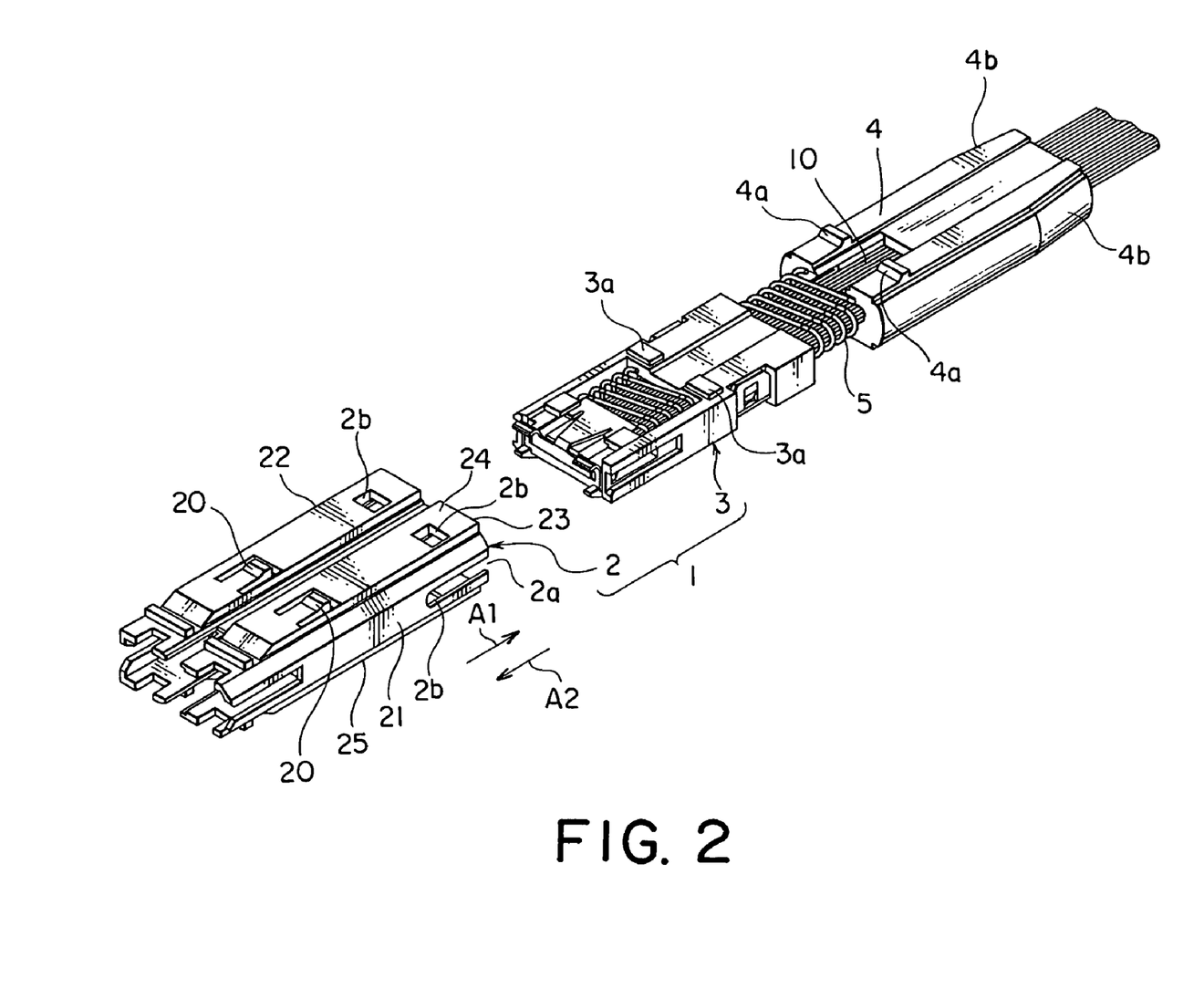
FIG. 2 is an enlarged perspective view of the optical connector in FIG. 1 in a disassembled state.

Referring to FIGS. 1 and 2, an optical connector 1 according to an embodiment of this invention will be described.

The optical connector 1 is for use in connecting an optical fiber 10. The optical fiber 10 has a ribbon-like shape and comprises a number of fiber wires arranged in parallel to one another and bonded to one another in the manner known in the art. Although the optical fiber 10 has a size very short for convenience of illustrating, the size is usually designed to be longer than that in FIG. 1.

The optical connector 1 comprises a shell member (plug frame) 2, an internal member 3 received in the shell member 2, a stopper 4 engaged with the shell member 2, and a coil spring 5 interposed between the internal member 3 and the stopper 4. With respect to the shell member 2, the internal member 3 is movable in a first direction A1 while the movement in a second direction A2 opposite to the first direction A1 is inhibited or locked by engagement between a plurality of protrusions 3a and a plurality of locking members 20 which will later be described. Herein, the second direction A2 is a direction in which the optical connector 1 is connected to a mating optical connector.

The shell member 2 is made of a synthetic resin and is elastically deformable. The shell member 2 comprises first and second wall portions 21 and 22 faced to each other in a transversal direction perpendicular to the first and the second directions A1 and A2. Each of the first and the second wall portions 21 and 22 is provided with a slit 2a. The slit 2a extends in the second direction A2 from an end face of the shell member 2 which faces the first direction A1, i.e., a specific end face 23.

The shell member 2 further comprises third and fourth wall portions 24 and 25 connecting the first and the second wall portions 21 and 22 and faced to each other in a vertical direction. Each of the third and the fourth wall portions 24 and 25 is provided with a plurality of window portions 2b formed in the vicinity of the specific end face 23. As will later be described, the window portions 2b serve as an engaging portion to be engaged with the stopper 4.

The stopper 4 has a cylindrical shape with a through hole allowing the optical fiber 10 to be inserted therethrough. The stopper 4 has a trapezoidal shape in a top view and a rectangular shape in a side view. The optical fiber 10 is extracted from the internal member 3 through the through hole of the stopper 4 in the first direction A1. Thus, the stopper 4 is slidable with respect to the optical fiber 10.

The stopper 4 has a plurality of lock portions or protruding portions 4a to be fitted to the window portions 2b of the shell member 2 in one-to-one correspondence. When the protruding portions 4a are fitted to the window portions 2b, the stopper 4 is engaged with the shell member 2 in the first direction A1. In the state where the stopper 4 is engaged with the shell member 2, the coil spring 5 is compressed and urges the internal member 3 in the first direction A1. Thus, the coil spring 5 is a compression coil spring surrounding the optical fiber 10. The stopper 4 has a pair of tapered surfaces 4b defining a tapered portion therebetween which is formed in the vicinity of an end face facing the first direction A1 and gradually reduced in width. The optical connector 1 is used in an assembled state where the internal member 3 is received in the shell member 2 and the stopper 4 is engaged with the shell member 2. If the silts 2a are enlarged and opened, a part of the shell member 2 adjacent to the specific end face 23 is warped outward so that the window portions 2b are released from the protruding portions 4a. Consequently, the stopper 4 is forced out in the first direction A1 by an urging force of the coil spring 5. Accordingly, the protruding portions 4a are exposed outside the shell member 2 and can not be engaged with the window portions 2b. In this state, the internal member 3 and the stopper 4 can easily be pulled out from the shell member 2 in the first direction A1. Thus, the optical connector 1 can be disassembled into the shell member 2, the internal member 3, the stopper 4, and the coil spring 5. The slits 2a may be understood as a release operation portion.

Figure 3:
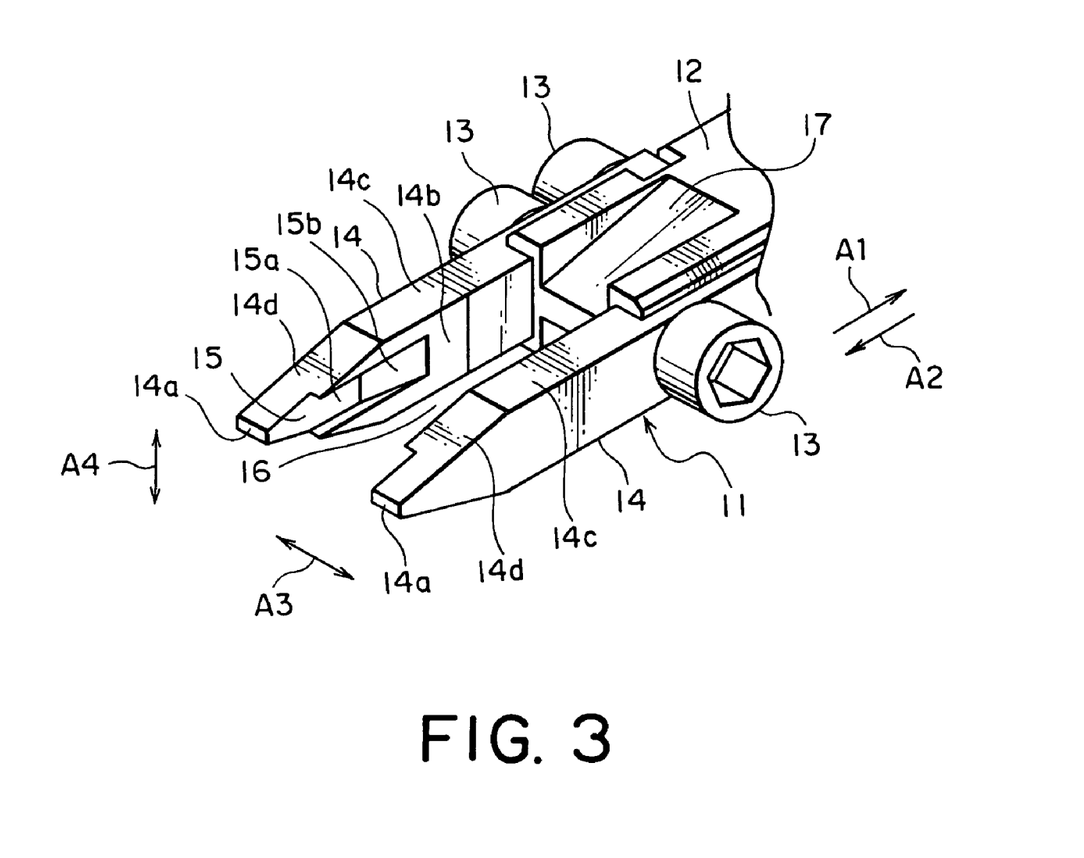
FIG. 3 is an enlarged perspective view of a characteristic part of the disassembling tool illustrated in FIG. 1.

Next referring to FIGS. 1 and 3, description will be made of a disassembling tool 11 according to the embodiment of this invention. In FIG. 1, the disassembling tool 11 is faced to the optical connector 1.

The disassembling tool 11 is adapted to disassemble the optical connector 1 mentioned above and comprises a tool body 12 and a pair of finger portions 14 extending from the tool body 12 in the first direction A1 in parallel to each other. Each of the finger portions 14 is removably coupled to each of opposite side surfaces of the tool body 12 by two screws 13. Thus, the screws 13 serve as a coupling structure.

The finger portions 14 have extending ends 14a in the second direction A2 and confronting surfaces 14b faced to each other in a third direction A3 perpendicular to the first and the second directions A1 and A2. Each of the finger portions 14 has a pair of adjacent surfaces 14c which are adjacent to the confronting surface 14b and are opposite to each other in a fourth direction A4 perpendicular to the second and the third directions A2 and A3. Each of the adjacent surfaces 14c of each finger portion 14 has a slant surface 14d inclined to reduce the thickness of the finger portion 14 in the forth direction towards the extending end 14a. As will later be described, the slant surface 14a serves as a disengaging portion for disengaging the shell member 2 and the stopper 4 by enlarging and opening the slit 2a. The slant surface 14d may be formed on only one of the adjacent surfaces 14c.

The confronting surface 14b of each finger portion 14 is provided with a groove 15 extending from the extending end 14a in the first direction A1 and adapted to receive a part of the optical connector 1, i.e., the stopper 4. The groove 15 on the confronting surface 14b of each finger portion 14 has a bottom including a parallel portion 15a extending from the extending end 14a in parallel to the first direction A1 and a sloped portion 15b extending from the parallel portion 15a and inclined in a direction towards the other finger portion 14.

Next, description will be made of a method of using the disassembling tool 11.

Figure 4A:
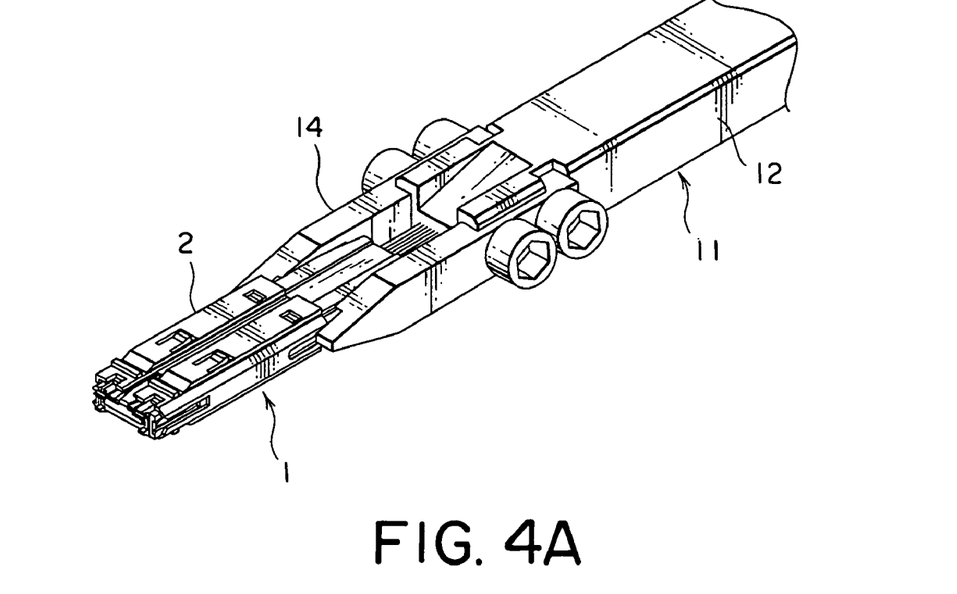
FIG. 4A is a perspective view for describing a first step of disassembling the optical connector.
Figure 4B:
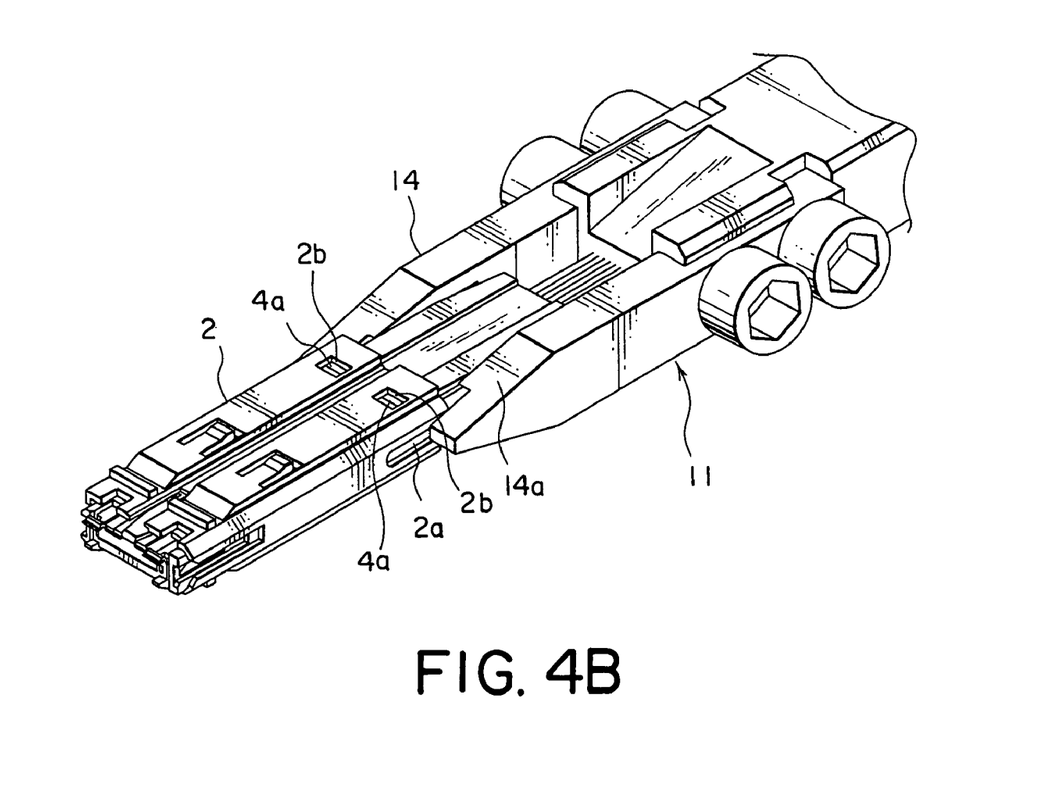
FIG. 4B is an enlarged view of a characteristic part of FIG. 4A.

Referring to FIGS. 4A and 4B, a first step of disassembling the optical connector 1 will be described. The stopper 4 of the optical connector 1 is inserted into a space 16 between the finger portions 14. At this time, left and right ends of the stopper 4 are inserted into the grooves 15 of the finger portion 14. The optical fiber 10 is arranged along a guide surface 17 inclined in a direction same as that of the slant surfaces 14d. More particularly, the guide surface 17 is inclined parallel to the slant surfaces 14d. Furthermore, the extending ends 14a of the finger portions 14 are positioned at entrances of the slits 2a of the shell member 2, respectively.

Figure 5A:
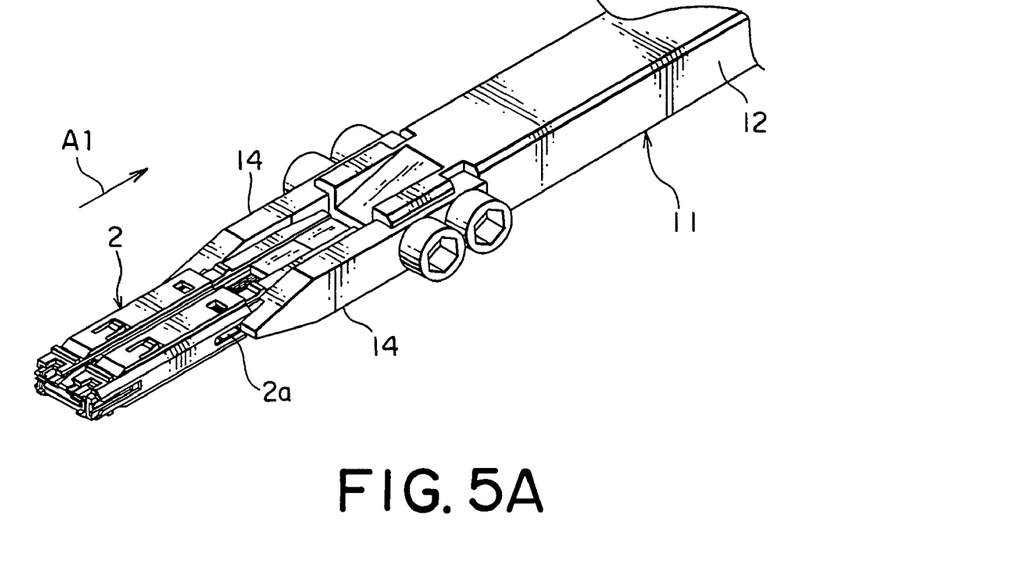
FIG. 5A is a perspective view for describing a second step of disassembling the optical connector.
Figure 5B:
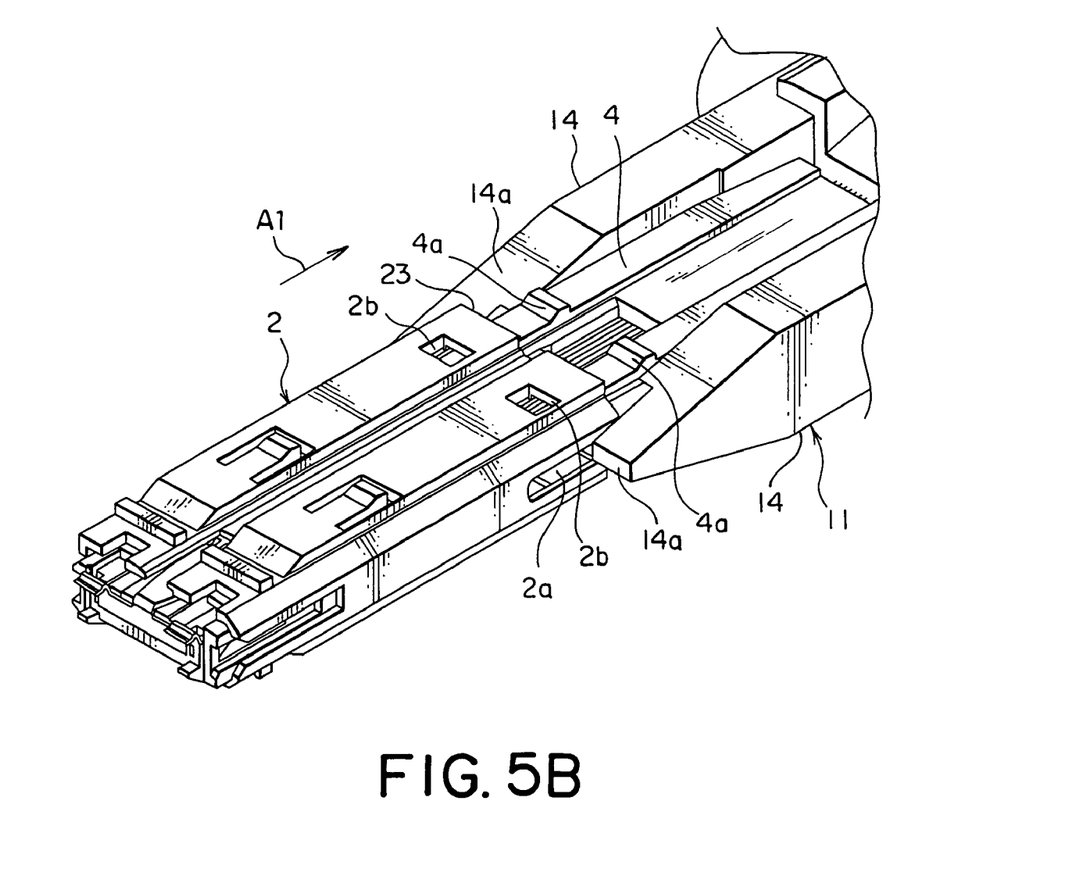
FIG. 5B is an enlarged view of a characteristic part of FIG. 5A.

Next referring to FIGS. 5A and 5B, a second step will be described. The extending ends 14a of the finger portions 14 are forced into the slits 2a of the shell member 2. Then, the slits 2a are enlarged and opened so that the part of the shell member 2 adjacent to the specific end face 23 is warped outward. In this event, the window portions 2b are disengaged from the protruding portions 4a. Consequently, by the urging force of the coil spring 5 (see FIG. 2), the stopper 4 is forced out in the first direction A1. The stopper 4 is guided by the grooves 15 to move in the first direction A1 and is stopped at a position where the tapered surface 4b meets the sloped portions 15b.

Figure 6A:
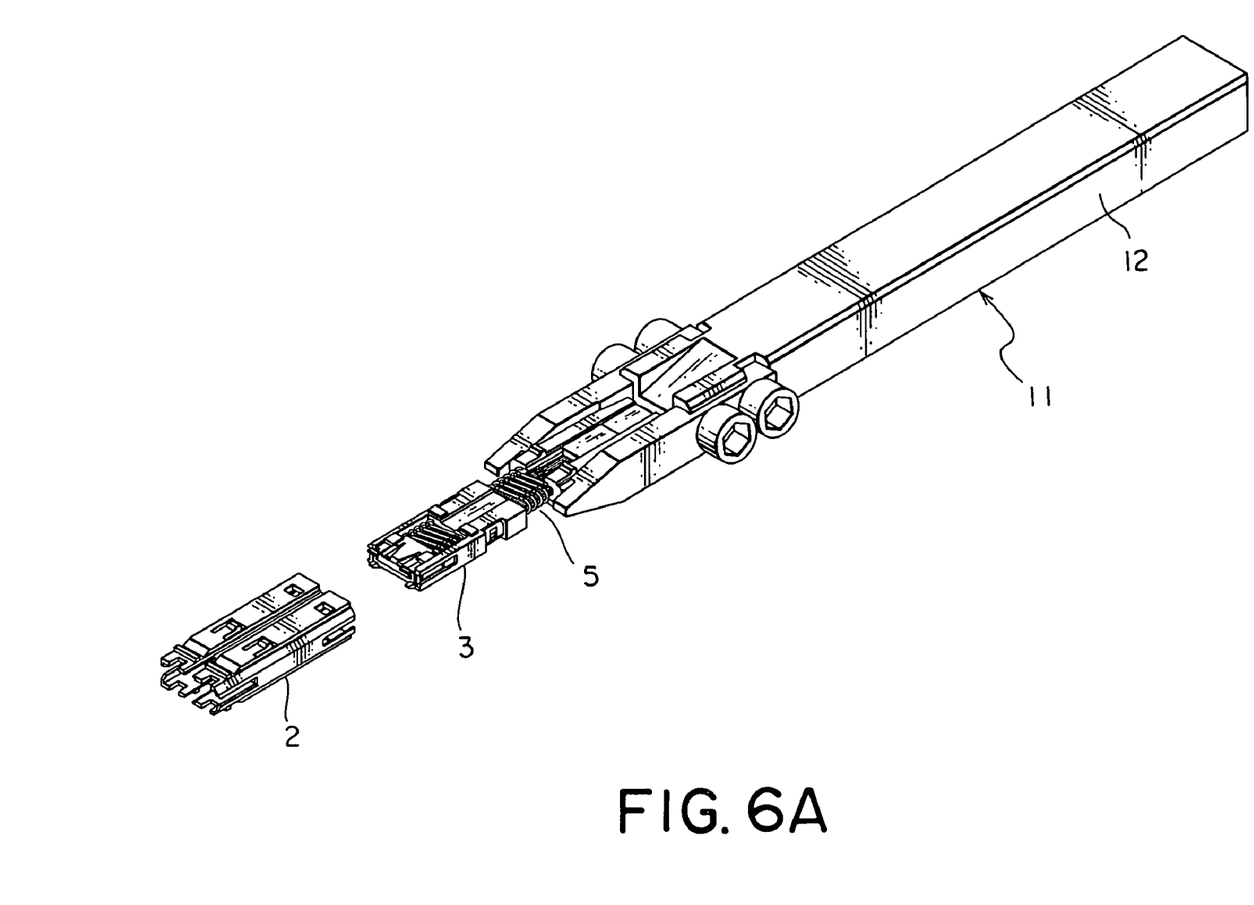
FIG. 6A is a perspective view for describing a third step of disassembling the optical connector.
Figure 6B:
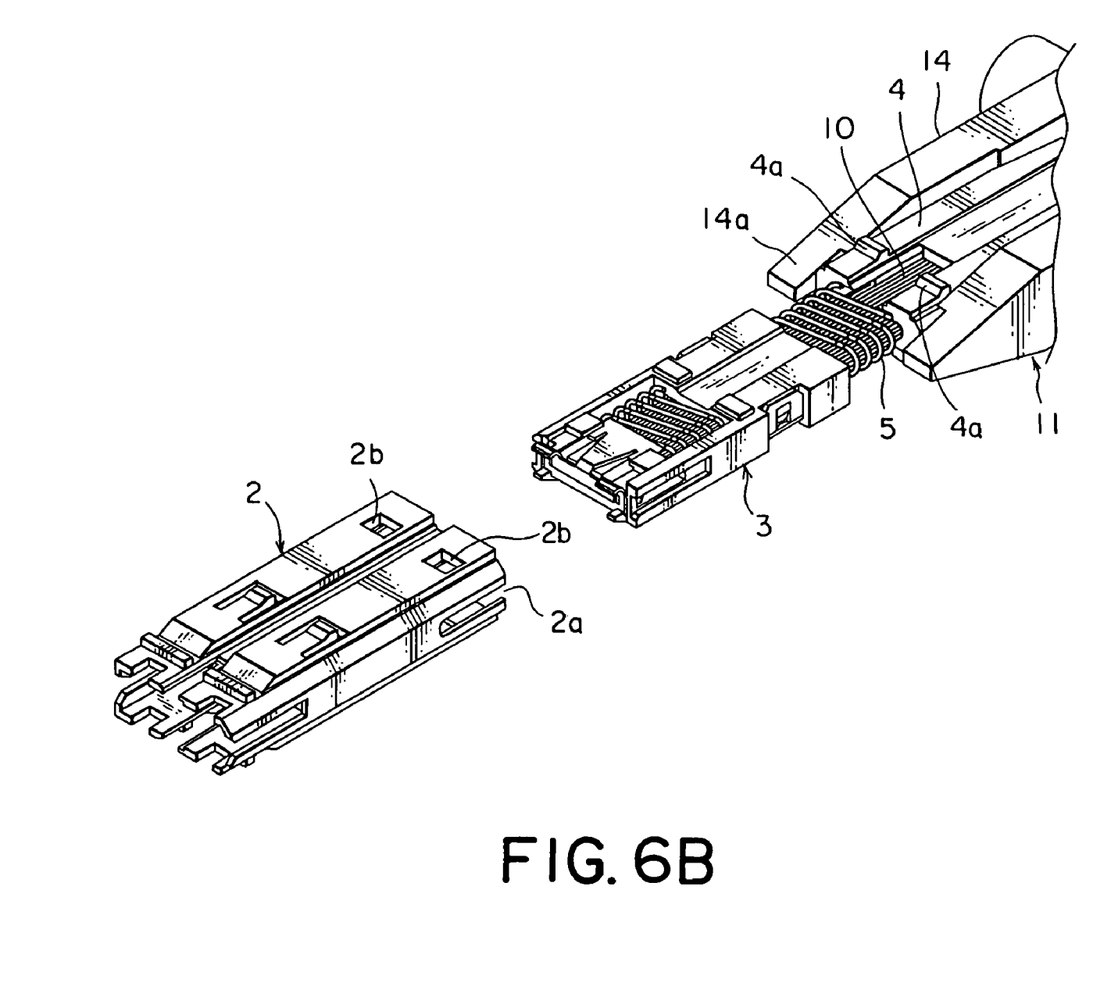
FIG. 6B is an enlarged view of a characteristic part of FIG. 6A.

Referring to FIGS. 6A and 6B, a third step will be described. The optical fiber 10, the disassembling tool 11, and the stopper 4 are pulled by fingers. Then, the internal member 3 is pulled out from the shell member 2 as illustrated in the figures. Thus, the optical connector 1 is disassembled into the shell member 2 and other parts.

While the present invention has thus far been described in connection with a preferred embodiment thereof, it will readily be possible for those skilled in the art to put this invention into practice in various other manners.

What is claimed is:

1. A disassembling tool for disassembling an optical connector, the disassembling tool comprising:
    a tool body having a guide surface for guiding an optical fiber connected to the optical connector; and
    a pair of finger portions extending from the tool body in a second direction in parallel to each other,
    the finger portions having extending ends in the second direction and confronting surfaces faced to each other in a third direction perpendicular to the second direction,
    each of the finger portions having a pair of adjacent surfaces opposite to each other in a fourth direction perpendicular to the second and the third directions,
    at least one of the adjacent surfaces of each finger portion having a slant surface inclined to reduce the thickness of the finger portion in the fourth direction towards the extending end,
    each of the confronting surface having a groove extending from the extending end in a first direction opposite to the second direction,
    the groove being adapted to receive a part of the optical connector.

2. The disassembling tool according to claim 1, wherein the groove on the confronting surface of each finger portion has a bottom including a parallel portion extending from the extending end in parallel to the first direction, and a sloped portion extending from the parallel portion and inclined in a direction towards the other finger portion.

3. The disassembling tool according to claim 1, further comprising a coupling structure removably coupling the finger portion to the tool body.

4. The disassembling tool according to claim 1, wherein the guide surface is inclined in a direction same as that of the slant surface.

5. A method for disassembling an optical connector using a disassembling tool comprising a tool body having a guide surface for guiding an optical fiber connected to the optical connector and a pair of finger portions extending from the tool body in a second direction in parallel to each other, the finger portions having extending ends in the second direction and confronting surfaces faced to each other in a third direction perpendicular to the second direction, each of the finger portions having a pair of adjacent surfaces opposite to each other in a fourth direction perpendicular to the second and the third directions, at least one of the adjacent surfaces of each finger portion having a slant surface inclined to reduce the thickness of the finger portion in the fourth direction towards the extending end, each of the confronting surface having a groove extending from the extending end in a first direction opposite to the second direction, and the groove being adapted to receive a part of the optical connector, the optical connector comprising a shell member having an engaging portion, an internal member holding the optical fiber and received in the shell member to be removable in a first direction, a stopper engaged with the engaging portion in the first direction, and a spring engaged with the internal member and the stopper and urging the internal member towards a second direction opposite to the first direction, the shell member having a release operation portion for releasing the engaging portion from the stopper, said method comprising the following steps:
    (a) inserting the stopper into a space between the finger portions to receive the stopper in the groove;
    (b) operating the release operation portion at the extending end to release the engaging portion from the stopper; and
    (c) guiding along the groove the stopper pressed and moved by the spring.

* * * * *